(12) United States Patent
Zhang et al.

(10) Patent No.: US 11,068,701 B2
(45) Date of Patent: Jul. 20, 2021

(54) APPARATUS AND METHOD FOR VEHICLE DRIVER RECOGNITION AND APPLICATIONS OF SAME

(71) Applicant: XMotors.ai Inc., Mountain View, CA (US)

(72) Inventors: Cong Zhang, Mountain View, CA (US); Tianpeng Feng, Mountain View, CA (US); Cheng Lu, Mountain View, CA (US); Yandong Guo, Mountain View, CA (US); Jun Ma, Mountain View, CA (US)

(73) Assignee: XMOTORS.AI INC., Mountain View, CA (US)

( * ) Notice: Subject to any disclaimer, the term of this patent is extended or adjusted under 35 U.S.C. 154(b) by 0 days.

(21) Appl. No.: 16/439,870

(22) Filed: Jun. 13, 2019

(65) Prior Publication Data

US 2020/0394390 A1    Dec. 17, 2020

(51) Int. Cl.
| | |
|---|---|
| *G06K 9/00* | (2006.01) |
| *G06K 9/20* | (2006.01) |
| *G06K 9/62* | (2006.01) |
| *H04N 5/235* | (2006.01) |

(52) U.S. Cl.
CPC ..... *G06K 9/00288* (2013.01); *G06K 9/00228* (2013.01); *G06K 9/00268* (2013.01); *G06K 9/00832* (2013.01); *G06K 9/2027* (2013.01); *G06K 9/6215* (2013.01); *G06K 9/6217* (2013.01); *H04N 5/2354* (2013.01)

(58) Field of Classification Search
CPC .......... G06K 9/00228; G06K 9/00268; G06K 9/00288; G06K 9/2027; G06K 9/6215; G06K 9/00832; G06K 9/6217; H04N 5/2354
See application file for complete search history.

(56) References Cited

U.S. PATENT DOCUMENTS

| | | | | |
|---|---|---|---|---|
| 10,322,728 | B1 * | 6/2019 | Porikli | G06K 9/00302 |
| 10,643,085 | B1 * | 5/2020 | Kim | G06K 9/00268 |
| 2001/0036298 | A1 * | 11/2001 | Yamada | G06K 9/00228 |
| | | | | 382/118 |
| 2004/0082480 | A1 * | 4/2004 | Daly | A01N 43/90 |
| | | | | 504/356 |

(Continued)

*Primary Examiner* — Anner N Holder
(74) *Attorney, Agent, or Firm* — Locke Lord LLP; Tim Tingkang Xia, Esq.

(57) ABSTRACT

Apparatus for vehicle driver recognition includes: a NIR LED illuminator, configured to emit NIR light in the vehicle; a NIR light sensing unit, configured to capture reflected NIR light; an image controlling and processing unit, configured to coordinate the NIR LED illuminator and the NIR light sensing unit, and analyze the reflected NIR light to generate an image; a face detector, configured to determine that a human face exists in the image, and identify a face region; a face feature extractor, configured to analyze the face region to extract a feature vector representing the face region; a face feature dictionary, configured to store existing feature vectors; a face retrieval system, configured to generate an identification result, indicating whether a similarity between the feature vector and any of the existing feature vectors is greater than a first threshold; and a user interface, configured to display the identification result.

21 Claims, 5 Drawing Sheets

(56) References Cited

U.S. PATENT DOCUMENTS

| | | | |
|---|---|---|---|
| 2005/0082480 A1* | 4/2005 | Wagner | G02B 5/208 250/338.1 |
| 2005/0226472 A1* | 10/2005 | Komura | B60R 25/255 382/118 |
| 2008/0069403 A1* | 3/2008 | Breed | G06K 9/00832 382/104 |
| 2010/0292578 A1* | 11/2010 | Sato | G06K 9/00013 600/473 |
| 2013/0243271 A1* | 9/2013 | Kawahara | G06K 9/00275 382/118 |
| 2015/0015482 A1* | 1/2015 | Njolstad | G06F 3/01 345/156 |
| 2017/0312614 A1* | 11/2017 | Tran | A61B 5/11 |
| 2018/0012110 A1* | 1/2018 | Souche | G06F 16/50 |
| 2018/0324367 A1* | 11/2018 | Siddiqui | H04N 5/243 |
| 2019/0138790 A1* | 5/2019 | Matsumura | G06K 9/00369 |
| 2019/0285541 A1* | 9/2019 | Takashima | G01N 21/27 |
| 2019/0297278 A1* | 9/2019 | Sumi | H04N 5/332 |
| 2019/0379480 A1* | 12/2019 | Tanzi | H04Q 11/0062 |
| 2020/0065563 A1* | 2/2020 | Zou | G06K 9/00288 |

* cited by examiner

APPARATUS AND METHOD FOR VEHICLE DRIVER RECOGNITION AND APPLICATIONS OF SAME

FIELD OF THE INVENTION

The present invention relates generally to artificial intelligence, and more particularly to apparatus and method for in-cabin driver recognition and applications of the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Person recognition that distinguishes the identity of individual among a group of people serves as a critical function for many applications. Such recognition requires biometric characteristic collecting from a group of target people. A good collection of such biometric information, more specifically nice statistical distribution of such collected data, requires statistically significant separation of each data point in its feature space.

In-cabin driver identification (driver ID) draws fast-growing attention in automotive industry recently because of its potential to enable numerous intelligent or safety functions for vehicles. For example, in-cabin driver identification can be used as a replacement of vehicle key for smooth keyless entry experience, or otherwise trigger alarm for any illegal entry. Also, it equips the vehicle with various customizations based on driver preference such as seat position, cabin temperature, rear-view mirror angle etc. More recently, this can also be used as input for many in-cabin entertainments or interfaces. With knowledge of driver ID, an in-dash system of a vehicle can provide customized entertaining functions such as playing a driver's favorite album, navigating on personalized route, and feeding driver with liked news channel.

There are primarily two types of person recognition that are actively used in the industry: intrusive and contactless. The intrusive method typically requires direct measurement of biometric characteristic, such as DNA fingerprinting that explicitly links to an individual's identification. The intrusive method is superior in terms of identification accuracy. However, such methods rely heavily on a well-controlled lab environment, expensive devices and long testing time. Besides, its nature of requiring direct contact between the system and the individual's body may lead to unpleasant and obtrusive experience. Thus, the demanding time and the cost of such method make it unpractical, if not impossible, to be applied in majority of real-time applications, including vehicle in-cabin setting.

Contactless method tries to identify individual based on indirect measurement of biometric characteristics, for example footprint, handwriting or face recognition. Most contactless person identification techniques do not require expensive devices and high-skill professionals, thus significantly reducing the cost.

Among all these contactless techniques, camera-based person identification has attracted great interest in academia and industries. Camera-based person identification relies on only camera module and subsequent computing module incorporating specific algorithm to distinguish the individual. These algorithms aim at extracting salient features from the input images, then make decision based on similarity or dissimilarity among previously learned feature dictionary. These features may be extracted from various characteristics, for example body posture, height, weight, skin and moving pattern, etc. The most robust and accurate camera-based identification method widely adopted by industries is face recognition technique, especially in the automotive in-cabin applications.

In-cabin driver face recognition is an emerging technology which provides a contact-free and accurate solution to the driver identification problem. In-cabin driver face recognition uses a camera to capture the facial biometric information and compares it with stored facial information library to find the best match. That being said, the system should include two modules: a facial feature library and a face recognition module. The facial feature library can register a new piece of facial information or delete an existing piece of facial information. The face recognition module captures images by camera and extracts features using designed algorithm and find the best match in the pre-built facial feature library. The first process is called face registration while the second process is called face retrieval.

However, in-cabin face recognition is fundamentally different from general face recognition in many ways. First, the in-cabin camera-based face recognition needs to be robust under all lighting conditions, including in the pitch-dark environment. Different from the most face recognition settings that are either under well-illuminated outdoor scene or assuming well-controlled indoor illumination, in-cabin face recognition raises more challenges in terms of imaging and image quality. Even for outdoor recognition applications which may suffer from insufficient lighting, a strong light compensation can be easily integrated. However, in-cabin lighting is difficult because in-cabin device is very sensitive to power consumption which may lead to severe heating due to its smaller size compared with general face recognition device. Besides, a compensation light source for better imaging visible to human eyes causes unpleasant experience for vehicle drivers. The strong illumination visible to human eyes targeting a driver's face not only harms human eyes, but also causes distraction which may lead to traffic accidents.

Other than the challenge on imaging, in-cabin face recognition is also unique in the way that it should operate with restrictive computing resource. In-cabin face recognition, including both face registration and retrieval, need to consume the minimum amount of computational resource because all the algorithms are operating in embedded system, namely an electronics controlling unit (ECU), that are only equipped with limited computing power. Compared with general face recognition methods that are incorporated in either strong local servers or even online cloud with theoretically infinite computing power, an ECU offers little luxury in terms of scalability and real-time performance. The algorithmic design for face recognition should be very careful to reduce the computational load in order to produce a practical in-cabin face recognition system.

Thirdly, in-cabin face recognition serves as a very special role in the vehicle, as being the input for various modules and in the meantime requiring nice presentation in user interfaces. As mentioned before, the result of face recognition should be connected to various functional modules and be transmitted to vehicle displays such as in-dash display, head-up display or dash board. The complex connectivity of the face recognition system to other modules further increases the difficulty of designing such a system.

Compared with other recognition scenarios in which the camera is outside of the vehicle, in-cabin face recognition is different. For example, out-of-vehicle surveillance recognition system can only capture one, or at most a few, images for ID registration, while in-cabin should achieve higher accuracy by capturing multiple images of the target faces from multiple perspectives. By capturing images from more perspectives, the system can get more comprehensive understanding about drivers' faces, thus making recognition more robust regardless of driver's head pose.

Therefore, a heretofore unaddressed need exists in the art to address the aforementioned deficiencies and inadequacies.

SUMMARY OF THE INVENTION

The present invention relates to apparatus and method for visualizing potential behaviors of surrounding objects of a vehicle.

In one aspect of the invention, an apparatus for vehicle driver recognition includes: a near infrared (NIR) light-emitting diode (LED) illuminator, configured to emit NIR light in the vehicle; a near infrared (NIR) light sensing unit, configured to capture reflected NIR light; an image controlling and processing unit, configured to coordinate the NIR LED illuminator and the NIR light sensing unit, and analyze the reflected NIR light captured by the NIR light sensing unit to generate an image; a face detector, configured to determine that a human face exists in the image, and identify a face region of the human face; a face feature extractor, configured to analyze the face region to extract a feature vector representing the face region; a face feature dictionary, configured to store existing feature vectors; a face retrieval system, configured to generate an identification result, the identification result indicating whether a similarity between the feature vector and any of the existing feature vectors is greater than a first threshold; and a user interface, configured to display the identification result.

In one embodiment, the NIR light sensing unit is a focal plane array (FPA) NIR light sensing unit.

In one embodiment, the NIR light sensing unit is covered with a color filter, the color filter having a passing band between 825 nm and 875 nm. In another embodiment, the NIR light sensing unit is covered with a color filter, the color filter having a passing band between 915 nm and 965 nm.

In one embodiment, the image controlling and processing unit is configured to coordinate the NIR LED illuminator and the NIR light sensing unit by controlling one or more of: a duty cycle of the NIR LED illuminator; an analog gain of the NIR light sensing unit; a digital gain of the NIR light sensing unit; an exposure time of the NIR light sensing unit; and a frame rate of the NIR light sensing unit.

In one embodiment, the image controlling and processing unit is configured to coordinate the NIR LED illuminator and the NIR light sensing unit to generate an image with optimal imaging quality.

In one embodiment, the face detector is configured to employ a deep neural network (DNN) to determine that a human face exists in the image, and identify a face region of the human face. In one embodiment, the deep neural network is a Multi-Task Convolutional Neural Network (MTCNN). In another embodiment, the deep neural network is a Fast Region-based Convolutional Neural Network (Fast R-CNN).

In one embodiment, the apparatus further includes a face alignment unit. The face alignment unit is configured to calibrate the face region to a calibrated face region associated with an upright pose of a driver, wherein the face feature extractor is configured to analyze the calibrated face region to extract a feature vector representing the calibrated face region.

In one embodiment, the face feature extractor is configured to employ one or more of: a backbone network; a local feature descriptor; a clustering technique; and a dimension reduction technique.

In one embodiment, the similarity is a Cosine similarity.

In another aspect of the invention, a method for vehicle driver recognition includes: emitting, by a near infrared (NIR) light-emitting diode (LED) illuminator, NIR light in the vehicle; capturing, by a near infrared (NIR) light sensing unit, reflected NIR light; coordinating, by an image controlling and processing unit, the NIR LED illuminator and the NIR light sensing unit; analyzing, by an image controlling and processing unit, the reflected NIR light captured by the NIR light sensing unit to generate an image; determining that a human face exists in the image; identifying a face region of the human face; analyzing the face region to extract a feature vector representing the face region; determining whether a similarity between the feature vector and any of the existing feature vectors in a face feature dictionary is greater than a first threshold; and when a similarity between the feature vector and a first existing feature vector in the face feature dictionary is greater than the first threshold, generating a first identification result indicating an identity associated with the first existing feature vector; and displaying the first identification result; when the similarity between the feature vector and any of the existing feature vectors in the face feature dictionary is not greater than a first threshold, generating a second identification result indicating that the feature vector does not exist in the face feature dictionary; displaying the second identification result; and storing the face feature in the face feature dictionary.

In one embodiment, the NIR light sensing unit is a focal plane array (FPA) NIR light sensing unit.

In one embodiment, the NIR light sensing unit is covered with a color filter, the color filter having a passing band between 825 nm and 875 nm. In another embodiment, the NIR light sensing unit is covered with a color filter, the color filter having a passing band between 915 nm and 965 nm.

In one embodiment, the image controlling and processing unit coordinates the NIR LED illuminator and the NIR light sensing unit by controlling one or more of: a duty cycle of the NIR LED illuminator; an analog gain of the NIR light sensing unit; a digital gain of the NIR light sensing unit; an exposure time of the NIR light sensing unit; and a frame rate of the NIR light sensing unit.

In one embodiment, the image controlling and processing unit coordinates the NIR LED illuminator and the NIR light sensing unit to generate an image with optimal imaging quality.

In one embodiment, the determining that a human face exists in the image and the identifying a face region of the human face is by: employing a deep neural network (DNN). In one embodiment, the deep neural network is a Multi-Task Convolutional Neural Network (MTCNN). In one embodiment, the deep neural network is a Fast Region-based Convolutional Neural Network (Fast R-CNN).

In one embodiment, the method further includes: calibrating the face region to a calibrated face region associated with an upright pose of a driver, wherein the calibrated face region is analyzed to extract a feature vector representing the calibrated face region.

In one embodiment, the analyzing the face region to extract a feature vector representing the face region is by employing one or more of: a backbone network; a local feature descriptor; a clustering technique; and a dimension reduction technique.

In one embodiment, the similarity is a Cosine similarity.

In yet another aspect, the invention relates to a non-transitory tangible computer-readable medium storing instructions which, when executed by one or more processors, cause a method for vehicle driver recognition to be performed. The method includes: emitting, by a near infrared (NIR) light-emitting diode (LED) illuminator, NIR light in the vehicle; capturing, by a near infrared (NIR) light sensing unit, reflected NIR light; coordinating, by an image controlling and processing unit, the NIR LED illuminator and the NIR light sensing unit; analyzing, by an image controlling and processing unit, the reflected NIR light captured by the NIR light sensing unit to generate an image; determining that a human face exists in the image; identifying a face region of the human face; analyzing the face region to extract a feature vector representing the face region; determining whether a similarity between the feature vector and any of the existing feature vectors in a face feature dictionary is greater than a first threshold; and when a similarity between the feature vector and a first existing feature vector in the face feature dictionary is greater than the first threshold, generating a first identification result indicating an identity associated with the first existing feature vector; and displaying the first identification result; when the similarity between the feature vector and any of the existing feature vectors in the face feature dictionary is not greater than a first threshold, generating a second identification result indicating that the feature vector does not exist in the face feature dictionary; displaying the second identification result; and storing the face feature in the face feature dictionary.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

DETAILED DESCRIPTION OF THE INVENTION

Figure 1:
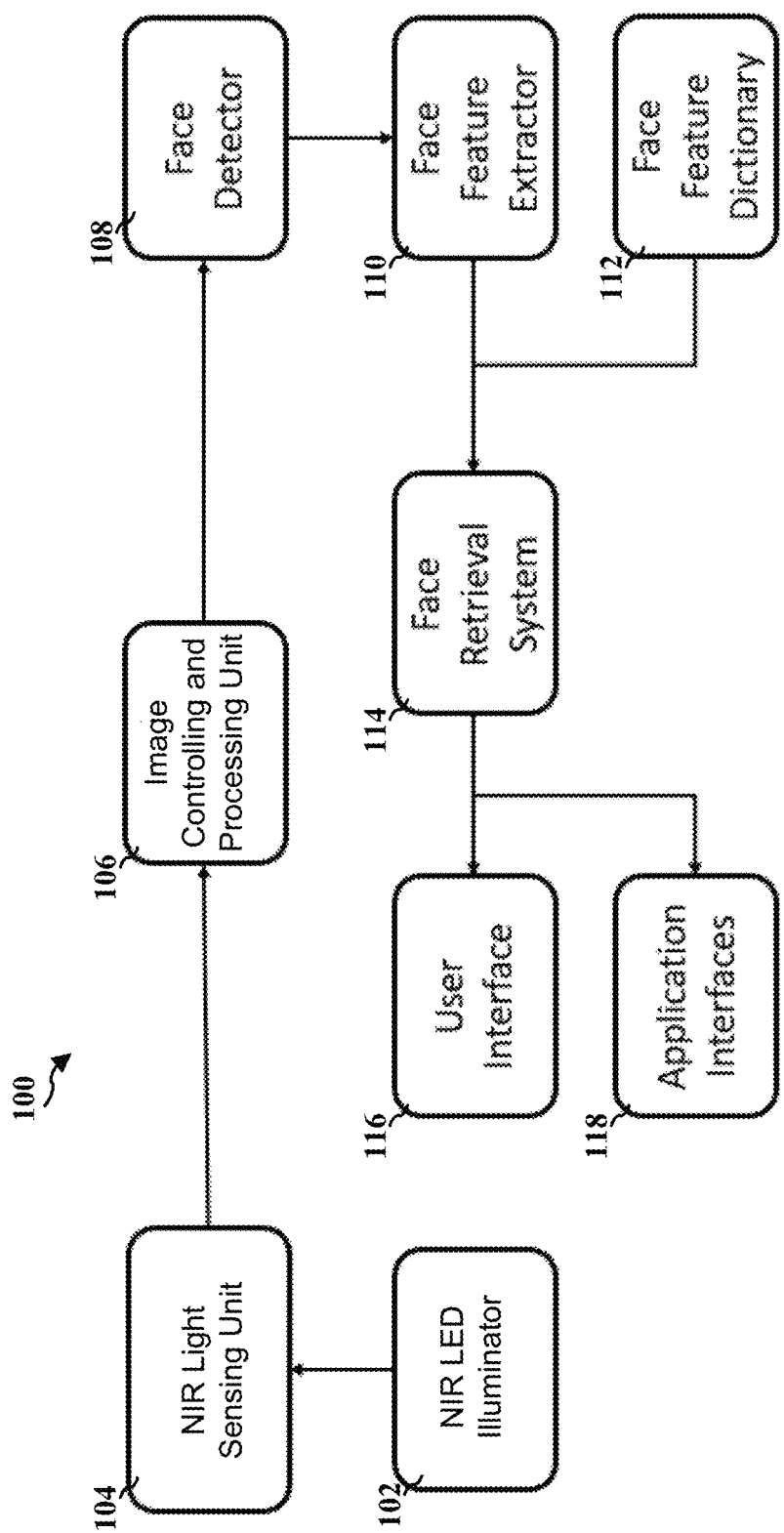
FIG. 1 shows schematically an overall architecture of a system for vehicle driver recognition according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/or" includes any and all combinations of one or more of the associated listed items.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The terms chip or computer chip, as used herein, generally refers to a hardware electronic component, and may refer to or include a small electronic circuit unit, also known as an integrated circuit (IC), or a combination of electronic circuits or ICs.

As used herein, the term microcontroller unit or its acronym MCU generally refers to a small computer on a single IC chip that can execute programs for controlling other devices or machines. A microcontroller unit contains one or more CPUs (processor cores) along with memory and programmable input/output (I/O) peripherals, and is usually designed for embedded applications.

The term interface, as used herein, generally refers to a communication tool or means at a point of interaction between components for performing wired or wireless data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term code, as used herein, may include software, firmware, and/or microcode, and may refer to programs, routines, functions, classes, and/or objects. Some or all code from multiple modules may be executed using a single (shared) processor. In addition, some or all code from multiple modules may be stored by a single (shared) memory. Further, some or all code from a single module may be executed using a group of processors. Moreover, some or all code from a single module may be stored using a group of memories.

The apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

FIG. 1 shows schematically an overall architecture of a system for vehicle driver recognition according to one embodiment of the invention. The system 100 includes a near infrared (NIR) light-emitting diode (LED) illuminator 102, a near-infrared (NIR) light sensing unit 104, an image controlling and processing unit 106, a face detector 108, a face feature extractor 110, a face feature dictionary 112, a face retrieval system 114, a user interface 116, and one or more application interfaces 118.

The NIR LED illuminator 102 emits light (i.e., electromagnetic radiation) in the NIR spectrum. The NIR LED illuminator 102 is configured to be synchronized with the NIR light sensing unit 104 and provides sufficient brightness so that the NIR light sensing unit 104 can capture the details of a driver's face even during nighttime. On the other hand, the NIR illuminator 102 are invisible to the driver because the NIR spectrum does not overlap with human's visible spectrum, thus eliminating chances of distraction and eye hazard. Human vision system is only responsive to the spectrum roughly ranging from 400 nm to 700 nm. In one embodiment, the NIR LED illuminator 102 emits light with a spectrum from 825 nm to 875 nm, aligning with the responsive spectrum of the NIR light sensing unit 104. In another embodiment, the NIR LED illuminator 102 emits light with a spectrum from 915 nm to 965 nm, aligning with the responsive spectrum of the NIR light sensing unit 104. In one embodiment, the NIR LED illuminator 102 is powered by pulse width modulation (PWM) with configurable duty cycles. A larger duty cycle provides more benefit for the NIR light sensing unit 104, however at the expense of higher risk of overheating. The poor conduction of heat due to limited module size demands a balance between illumination quality and overheating. Also, the duty cycle should be synchronized with the NIR light sensing unit 104, so that its radiation is fully utilized by the NIR light sensing unit 104, thus producing the best sensing quality. Such synchronization is achieved by the image controlling and processing unit 106 which will be further detailed below.

The light sensing unit 104 captures the light originated from the NIR LED illuminator 102 or other light source such as sun, moon or other illuminators with rich NIR components in its spectrum. The NIR light sensing unit 104 converts the illuminous intensity to electrical signal, more specifically digital readouts of the NIR light sensing unit 104. The NIR light sensing unit 104 captures light from either the NIR LED illuminator 102 or other light sources. In one embodiment, the NIR light sensing unit 104 is designed to be responsive only to specific band of spectrum. For example, the NIR light sensing unit 104 is designed to be responsive only to the band of spectrum from 825 nm to 875 nm. In another example, the NIR light sensing unit 104 is designed to be responsive only to the band of spectrum from 915 nm to 965 nm. This selective sensibility on spectrum may be implemented by applying a band-pass optical filter on top the NIR light sensing unit 104. It should be noted that the NIR light sensing unit does not rely solely on the NIR LED illuminator 102. Sun light has a spectrum much wider than that of human vision system and is strong in NIR band as well. The NIR light sensing unit 104 should work well, or even better, under good sunlight illuminated conditions. With that being said, the NIR LED illuminator 102 is still essential for low-light or dark conditions when NIR light source does not naturally exist.

In one embodiment, the light sensing unit 104 is a camera covered with a NIR band-pass filter. In one embodiment, the NIR light sensing unit 104 is a Focal Plane Array (FPA) NIR light sensing unit 104. A FPA NIR light sensing unit 104 is an image sensing device consisting of an array (typically rectangular) of light-sensing pixels at the focal plane of a lens. The FPA NIR light sensing unit 104 operates by detecting photons at particular wavelengths and then generating an electrical charge, voltage, or resistance in relation to the number of photons detected by each pixel. This charge, voltage, or resistance is then measured, digitized, and used to construct an image of the object, scene, or phenomenon that emitted the photons. The FPA NIR light sensing unit 104 may provide multiple properties to control its sensing behavior, including exposure time, digital gain, analog gain, gamma and frame rate. These properties are crucial to the image controlling and processing unit 106 to obtain the best image quality, which is the foundation of subsequent face registration or face retrieval.

The image controlling and processing unit 106 regulates the behaviors of both the NIR LED illuminator 102 and the NIR light sensing unit 104 and generates an image. The image controlling and processing unit 106 is configured to regulate the on/off period of the NIR LED illuminator 102 together with the light sensing shutter of the NIR light sensing unit 104, to fully utilize the energy from the NIR LED illuminator 102 for better imaging quality. Also, the image controlling and processing unit 106 may analyze the statistics of the digital readouts of the NIR light sensing unit 104 and sends commands to both the NIR LED illuminator 102 and the NIR light sensing unit 104. Some examples of the properties of the NIR light sensing unit 202 that the image controlling and processing unit 106 can control include exposure time, analog gain, digital gain. gamma and frame rate. Based on the commands sent by the image controlling and processing unit 106, the NIR LED illuminator 102 and the NIR light sensing unit can adjust their properties accordingly. The image controlling and processing unit 106 then generates an image with optimal imaging quality, to maximize the likelihood of successful face registration and face retrieval.

In one embodiment, the image controlling and processing unit 106 is incorporated in the Electronic Control Unit (ECU) of the vehicle. The image controlling and processing unit 106 sends commands to both the NIR LED illuminator 102 and the NIR light sensing unit 104 to coordinate them. More specifically, the image controlling and processing unit 106 coordinates the alignment of the duty cycle of the NIR LED illuminator 102 and the exposure time of the NIR light sensing unit 104 under low-light conditions. In one embodiment, the image controlling and processing unit 106 may analyze the statistics of the digital readouts of the NIR light sensing unit 104 to evaluate the illumination conditions. If the image controlling and processing unit 106 determines that the ambient illumination is strong enough, it will turn off the NIR LED illuminator 102, thus significantly reducing power consumption and heating.

Figure 2:
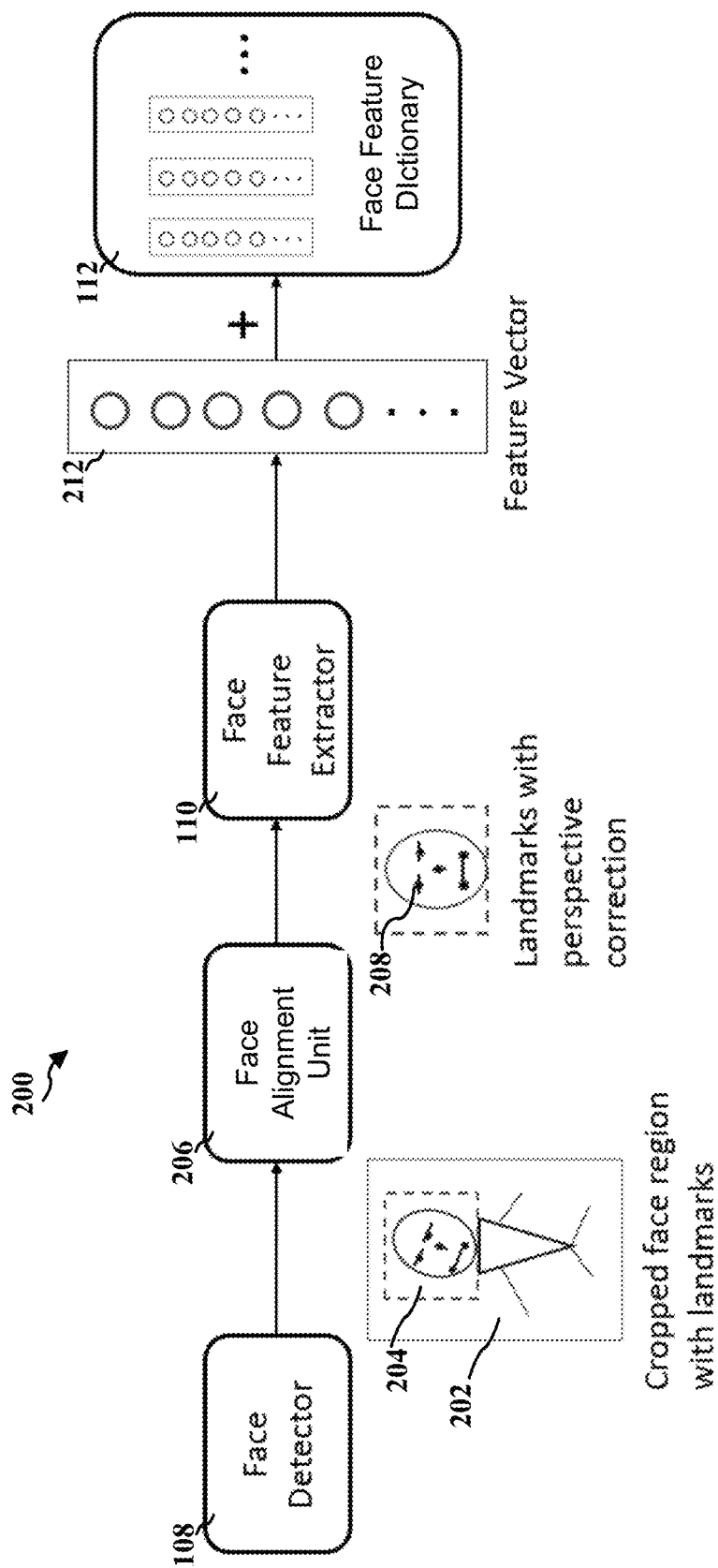
FIG. 2 shows schematically a flow chart of facial registration using a system for vehicle driver recognition according to one embodiment of the invention.

FIG. 2 shows schematically a flow chart of facial registration using a system for vehicle driver recognition according to one embodiment of the invention. The face detector 108 is configured to determine whether there is a human face region existing in the image 202 generated by the image controlling and processing unit 106. If the face detector 108 determines that a face region 204 of a human exists in the image 202 generated by the image controlling and processing unit 106, the face detector 108 locates position of the face region 204 using a bounding box. The face detector 108 can be implemented by a deep neural network (DNN) such as Multi-Task Convolutional Neural Networks (MTCNN), Fast Region-based Convolutional Neural Networks (Fast R-CNN) or any other deep neural networks. A deep neural network is an artificial neural network with multiple layers between the input and output layers. The DNN finds the correct mathematical manipulation to turn the input into the output, whether it be a linear relationship or a non-linear relationship. Each mathematical manipulation is considered a layer, and complex deep neural networks have many layers. The network moves through the layers calculating the probability of each output. A convolutional neural networks (CNN) is a class of deep neural networks, most commonly applied to analyzing visual imagery.

In one embodiment, the face detector 108 may be a piece of software or hardware implementation in ECU that can determine whether there is a face region 204 of a human exists in the image 202 generated by the image controlling and processing unit 106. The image 202 has been optimized by the image controlling and processing unit 106 as mentioned above. The face detector 108 may crop the face region 204 in the image 202. It should be noted that for in-cabin driver registration, images of the driver's face from different perspectives can increase robustness of face retrieval afterwards, making later face retrieval relatively invulnerable to perspective variation. Capturing images of the driver's face from different perspectives can be achieved by showing the driver visual guidance on the in-dash display, so that the driver can follow the visual guidance and move his head during registration until images of his faces from different perspective are captured.

In addition to the bounding box, the face detector 108 may also output a series of key facial points called landmarks 208. These landmarks 208 are points such as nose tip, center of eyes and mouth corners on human faces. These landmarks 208 are very crucial for later feature generation. The regions on the face that are close to these landmarks 208 are given higher weights during later face registration and face retrieval, because human face is most discriminative in these salient regions with each other. More importantly, these landmarks 208 can be used for perspective correction of the driver's face. It is very likely that the driver's face is not perfectly perpendicular to imaging plan when during face registration or face retrieval. Therefore, a perspective correction of the human face region 204 is necessary before further processing.

Based on the landmarks 208, the face alignment unit 206 calibrates the pose of the driver's face to an upright pose. In one embodiment, the face alignment unit 206 aligns the pose of the driver's face with triaxial angles including yaw, pitch and roll, therefore providing more information for later face recognition. It should be noted that the face alignment unit 206 may be an independent unit from the face detector 108, however it may also be a component integrated into the face detector 108. It also should be noted that compared with other system that only generates a bounding box, the alignment conducted by the face alignment unit 206 based on the landmarks 208 increases the accuracy of later face recognition.

The face feature extractor 110 analyzes the aligned face region 204 and extracts a feature vector 212 representing the face region 204. This process may also be called as face encoding. The face feature extractor 110 may be implemented by various neural network such as a backbone network (e.g. MobileNets) or a local feature descriptor (e.g. SIFT) plus clustering (e.g. K-means clustering) and its subsequent dimension reduction techniques like Bag-of-Words (BoW). A backbone network is a part of computer network that interconnects various pieces of network, providing a path for the exchange of information between different LANs or subnetworks. The scale-invariant feature transform (SIFT) is a feature detection algorithm in computer vision to detect and describe local features in images. K-means clustering is a method of vector quantization, originally from signal processing, that is popular for cluster analysis in data mining. K-means clustering aims to partition n observations into k clusters in which each observation belongs to the cluster with the nearest mean, serving as a prototype of the cluster. The bag-of-words (BoW) model is a simplifying representation used in natural language processing and information retrieval. In this model, a text (such as a sentence or a document) is represented as the bag (multiset) of its words, disregarding grammar and even word order but keeping multiplicity. The bag-of-words model has also been used for computer vision. It should be noted that for face registration, the system may need to capture multiple images of the same driver for better match.

In one embodiment, the face feature extractor 110 is essentially an encoder for the information of the face region 208 of each driver to be identified. In one embodiment, the face feature extractor 110 is incorporated in the ECU. The face feature extractor 110 outputs a high dimensional feature vector 212 representing the face region 204 of the detected driver. The feature vector 212 should be a fair representation (mathematically speaking, a good discriminative distribution) of the face region 204 of the detected driver. It means that the feature vectors 212 of the same person, regardless of how they are captured, should be very close to each other in the feature space, while the feature vectors 212 of two different people should be well separated, even captured under the same conditions.

The face feature dictionary 112 stores the feature vectors of all registered drivers. The face feature dictionary 112 is able to add a new feature vector (e.g., the feature vector 212). The face feature dictionary 112 is also able to delete an existing feature vector. The face feature dictionary 112 may add or delete feature vectors in response to user's commands (e.g., the driver's commands). Alternatively, the face feature dictionary 112 may add or delete feature vectors automatically under certain circumstances (e.g., add the feature vector 212 after determining that it is a new one). The face feature dictionary 112 includes feature vectors 212 of different drivers and a lookup table that links every feature vector 212 with its corresponding driver.

Operating in the NIR spectrum reduces the negative impact of complicated illumination on recognition performance but raised more challenges on designing the algorithm. First, NIR-based recognition ignores hue information which is helpful to create stronger discrimination. Secondly, a large-scale face dataset needs to be collected to train the face feature extractor 110 based on deep convolutional neural networks (CNN). Considering that almost all public face images are in the visible (VIS) spectrum instead of the NIR spectrum, deep CNN may not be able to generalize because of the significant domain discrepancy. Therefore, both public VIS dataset (e.g. MS-Celeb-1M, VGGFace2) and private NIR images are used, and the NIR spectrum are oversampled to eliminate the imbalance simultaneously. MS-Celeb-1M is a public VIS dataset for recognizing face images and link them to corresponding entity keys in a knowledge base. VGGFace2 is another public VIS dataset which contains 3.31 million images of 9131 subjects.

Limited by the computational resource and the size of CNN parameters, controlling the tradeoff between the complexity (with respect to both time and space) and the model capacity is critical. Intensive arithmetical operations will consume huge amount of power and cause overheat, while too many parameters cost intolerable loading time. Thus, some light networks (e.g. Mobilenet, Shufflenet) with depth-wise separable convolution (DW Cony) and point-wise convolution (PW Cony) may be employed. Additionally, quantization and distillation techniques are also employed to reduce the amount of computation.

Compared to the outdoor environment where true positive rates are critical, the in-cabin scenarios focus more on both security and convenience, namely low false negative rates and high true positive rates. Thus, a test dataset that includes a variety of hard cases (e.g. glasses, illumination, head pose) is created, and substantial number of experiments are conducted with the test dataset to seek the better solution and to search for a best model. A model can be deployed only after passing the strict test.

To make users (e.g., the driver) feel involved and improve the accuracy of recognition, a registration guidance may be showed on the screen. More specifically, users should be in several different poses so that feature vectors corresponding to different perspectives can be extracted and stored in the face feature dictionary 112. Theoretically, information loss caused by the projection from three-dimensional (3D) real world to two-dimensional (2D) face images can be partly eliminated in this way, thus improving the face recognition performance in practice.

Figure 3:
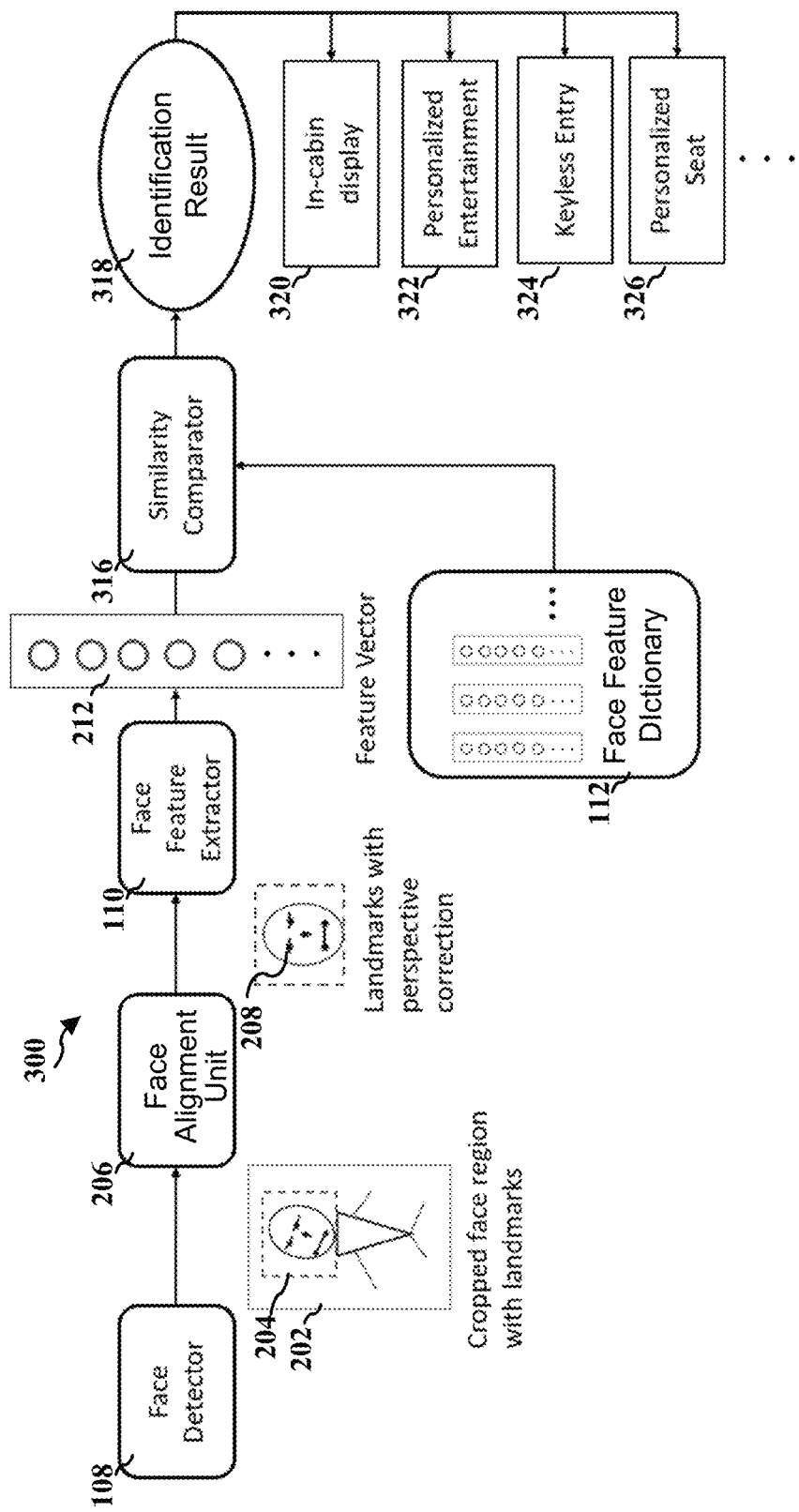
FIG. 3 shows schematically a flow chart of facial retrieval using a system for vehicle driver recognition according to one embodiment of the invention.

FIG. 3 shows schematically a flow chart of facial retrieval using a system for vehicle driver recognition according to one embodiment of the invention. Similar to the flow chart of facial registration as shown in FIG. 2, the face detector 108, the face alignment 206 and the face extractor function in the same way. If the face detector 108 determines that a face region 204 of a human exists in the image 202 generated by the image controlling and processing unit 106, the face detector 108 locates position of the face region 204 using a bounding box and outputs a series of landmarks 208. Based on the landmarks 208, the face alignment unit 206 calibrates the pose of the driver's face to an upright pose. The face feature extractor 110 analyzes the aligned face region 204 and extracts a feature vector 212 representing the face region 204.

The feature vector 212 finally generated by the face feature extractor 110 will be used to initiate a query to the face feature dictionary 112. More specifically, the face retrieval system 114 tries to find the most similar feature vector in the face feature dictionary 112. There are many ways to quantifying the similarity between two feature vectors and rank them accordingly. In one embodiment, the face retrieval system is a similarity comparator 316. The similarity comparator 316 uses Cosine similarity as the metric. For two N-dimensional feature vectors $f^q$ and $f^i$ representing an extracted feature vector 212 and an existing feature vector in the face feature dictionary 112, their Cosine similarity is measured by the following formula.

$$\text{similarity} = \cos(\theta) = \frac{f^q \cdot f^i}{\|f^q\| \|f^i\|}$$

The nominator is the dot product of the two N-dimensional feature vectors $f^q$ and $f^i$, while the denominator is the product of magnitudes of the two N-dimensional feature vectors $f^q$ and $f^i$. The feature vectors $f^q$ and $f^i$ are normalized to 1, so the denominator can be omitted, namely the Cosine similarity equivalent to Euclidean distance intrinsically in this case. The similarity comparator 316 then compares the Cosine similarity with a predetermined similarity threshold. If the Cosine similarity is greater than the predetermined similarity threshold, the similarity comparator 316 generates an identification result 318. In other words, the similarity comparator 316 identifies the identification of the driver (e.g., John Doe).

However, if the similarity comparator 316 does not find any match (i.e, no Cosine similarities is greater than the predetermined similarity threshold) in the face feature dictionary 112, then the similarity comparator 316 will output an identification result 318 indicating that the driver has not been registered yet, which in turn indicating potential illegal vehicle entry or needs for face registration.

As shown in FIG. 1 and FIG. 3, the face retrieval system 114 (e.g., the similarity comparator 316) outputs the identification result 318 to the user interface 116. The user interface 116 then displays accordingly to the driver (and passengers). In one embodiment, the user interface 116 is an in-cabin display 320. The in-cabin display 320 displays visual or audio feedback to the driver to notify the driver of the identification result 318. The user interface 116 can be any in-cabin video or audio devices including, but not limited to, dash board display, in-dash display, head-up display and speaker. The identification result 318 can be presented either graphically or textually, indicating failure or success of the face retrieval. Also, the user interface 116 outputs guidance for the driver to switch between the face registration mode and the face retrieval mode. Due to safety concern, the switch from the retrieval mode to the registration mode requires a second-step verification of identity such as password, finger print and key activation.

The face retrieval system 114 (e.g., the similarity comparator 316) may also output the identification result 318 to the one or more application interfaces 118. The one or more application interfaces 118 may include, but not limited to, a personalized entertainment system 322, a keyless entry system 324, a personalized seat system 326, as shown in FIG. 3. The one or more application interfaces 118 may also include an anti-theft system, a drive mode customization system, and a digital verified payment system. All of the one or more application interfaces 118 previously require extra verification of identity such as password, finger print and key activation.

Figure 4:
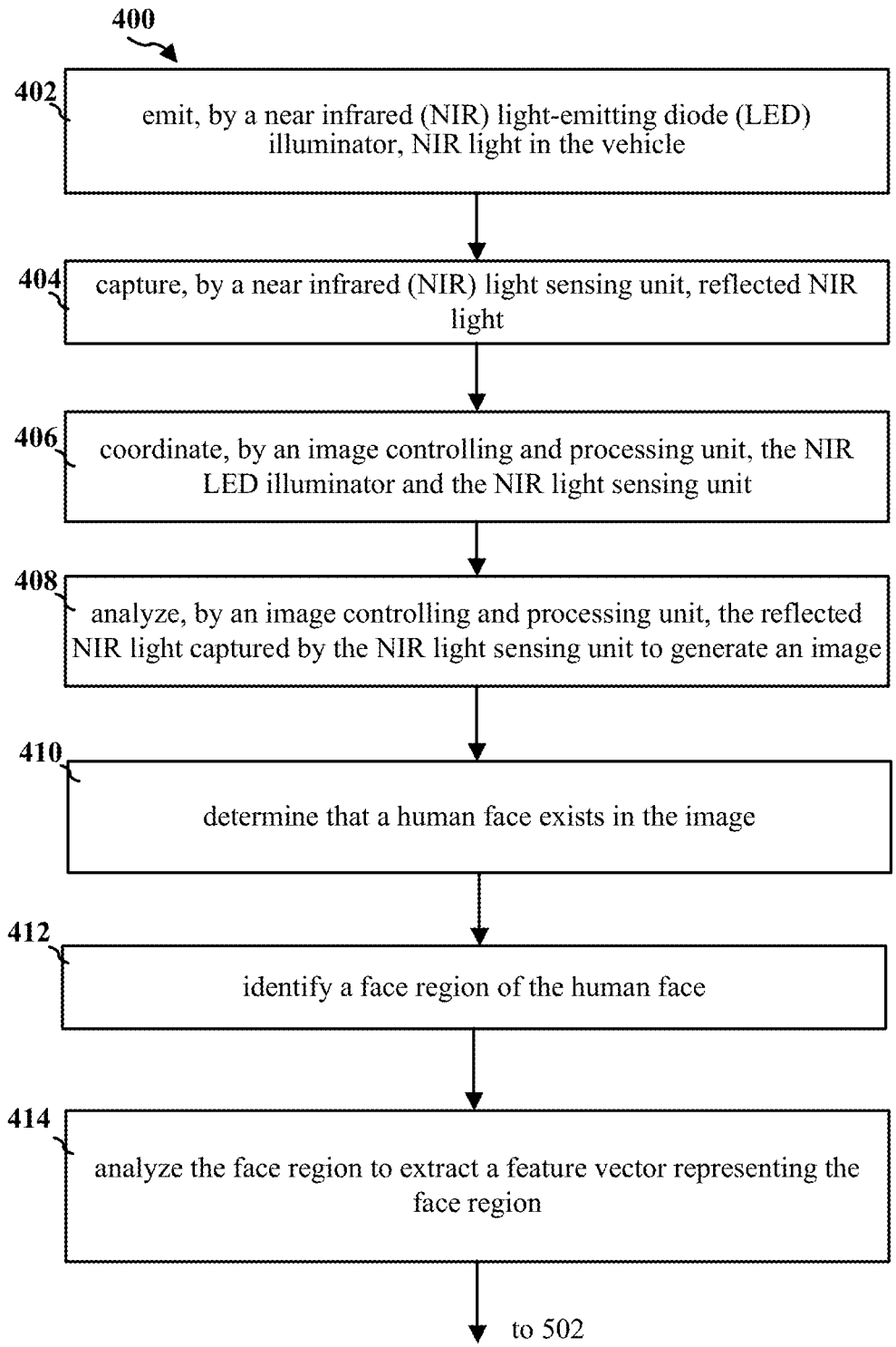
FIG. 4 shows schematically a flow chart of a method for vehicle driver recognition according to one embodiment of the invention.
Figure 5:
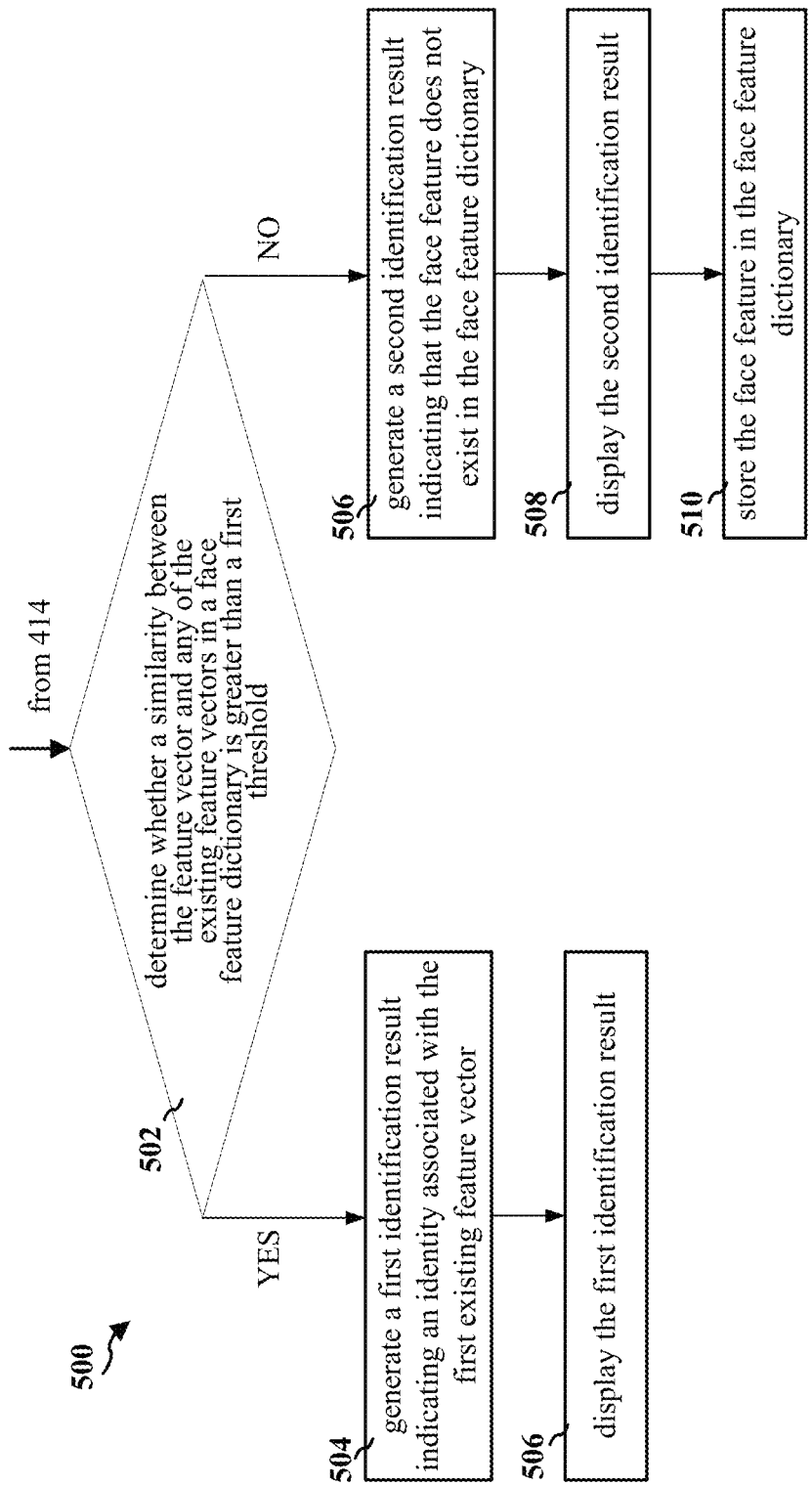
FIG. 5 shows schematically a flow chart of a method for vehicle driver recognition according to one embodiment of the invention.

In another aspect of the invention, the method for vehicle driver recognition, as shown in FIG. 4 and FIG. 5, includes the following steps. FIG. 4 and FIG. 5 jointly show schematically a flow chart of a method for vehicle driver recognition according to one embodiment of the invention. The method may be implemented by a system 100 for vehicle driver recognition described above. It should be noted that the method may be implemented by other apparatus. It should be noted that all or a part of the steps according to the embodiments of the invention may be implemented by hardware or a program instructing relevant hardware.

At step 402, the NIR LED illuminator 102 emits NIR light in the vehicle.

At step 404, the NIR light sensing unit 104 captures reflected NIR light.

At step 406, the image controlling and processing unit 106 coordinates the NIR LED illuminator and the NIR light sensing unit.

At step 408, the image controlling and processing unit 106 analyzes the reflected NIR light captured by the NIR light sensing unit to generate an image.

At step 410, the face detector 108 determines that a human face exists in the image.

At step 412, the face detector 108 identifies a face region of the human face.

At step 414, the face detector 108 analyzes the face region to extract a feature vector representing the face region. Step 414 is followed by step 502 in FIG. 5.

At step 502, the face retrieval system 114 determines whether a similarity between the feature vector and any of the existing feature vectors in a face feature dictionary 112 is greater than a first threshold.

When a similarity between the feature vector and a first existing feature vector in the face feature dictionary 112 is greater than the first threshold, at step 504, the face retrieval system 114 generates a first identification result indicating an identity associated with the first existing feature vector. At step 506, the user interface 116 displays the first identification result.

When the similarity between the feature vector and any of the existing feature vectors in the face feature dictionary 112 is not greater than a first threshold, at step 506, the face retrieval system 114 generates a second identification result indicating that the feature vector does not exist in the face feature dictionary 112. At step 508, the user interface 116 displays the second identification result. At step 510, the face feature dictionary 112 stores the face feature in the face feature dictionary 112.

Yet another aspect of the invention provides a non-transitory tangible computer-readable medium storing instructions which, when executed by one or more processors, cause the above disclosed method for vehicle driver recognition to be performed. The computer executable instructions or program codes enable the above disclosed apparatus or a similar system to complete various operations in accordance with the above disclosed method. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

What is claimed is:

1. An apparatus for vehicle driver recognition, comprising:
   a near infrared (NIR) light-emitting diode (LED) illuminator, configured to emit NIR light in the vehicle;
   a near infrared (NIR) light sensing unit, configured to capture reflected NIR light, wherein the NIR light sensing unit is a focal plane array (FPA) NIR light sensing unit;
   an image controlling and processing unit, configured to coordinate the NIR LED illuminator and the NIR light sensing unit, and analyze the reflected NIR light captured by the NIR light sensing unit to generate an image;
   a face detector, configured to determine that a human face exists in the image, and identify a face region of the human face;
   a face feature extractor, configured to analyze the face region to extract a feature vector representing the face region;
   a face feature dictionary, configured to store existing feature vectors;
   a face retrieval system, configured to generate an identification result, the identification result indicating whether a similarity between the feature vector and any of the existing feature vectors is greater than a first threshold; and
   a user interface, configured to display the identification result,
   wherein the image controlling and processing unit is configured to coordinate the NIR LED illuminator and the NIR light sensing unit by controlling one or more of:
   a duty cycle of the NIR LED illuminator;
   an analog gain of the NIR light sensing unit;
   a digital gain of the NIR light sensing unit; and
   a frame rate of the NIR light sensing unit.

2. The apparatus of claim 1, wherein the NIR light sensing unit is covered with a color filter, the color filter having a passing band between 825 nm and 875 nm.

3. The apparatus of claim 1, wherein the NIR light sensing unit is covered with a color filter, the color filter having a passing band between 915 nm and 965 nm.

4. The apparatus of claim 1, wherein the image controlling and processing unit is configured to coordinate the NIR LED illuminator and the NIR light sensing unit to generate an image with optimal imaging quality.

5. The apparatus of claim 1, wherein the face detector is configured to employ a deep neural network (DNN) to determine that a human face exists in the image, and identify a face region of the human face.

6. The apparatus of claim 5, wherein the deep neural network is a Multi-Task Convolutional Neural Network (MTCNN).

7. The apparatus of claim 5, wherein the deep neural network is a Fast Region-based Convolutional Neural Network (Fast R-CNN).

8. The apparatus of claim 1, further comprising:
a face alignment unit, configured to calibrate the face region to a calibrated face region associated with an upright pose of a driver, wherein the face feature extractor is configured to analyze the calibrated face region to extract a feature vector representing the calibrated face region.

9. The apparatus of claim 1, wherein the face feature extractor is configured to employ one or more of:
a backbone network;
a local feature descriptor;
a clustering technique; and
a dimension reduction technique.

10. The apparatus of claim 1, wherein the similarity is a Cosine similarity.

11. A method for vehicle driver recognition, comprising:
emitting, by a near infrared (NIR) light-emitting diode (LED) illuminator, NIR light in the vehicle;
capturing, by a near infrared (NIR) light sensing unit, reflected NIR light, wherein the NIR light sensing unit is a focal plane array (FPA) NIR light sensing unit;
coordinating, by an image controlling and processing unit, the NIR LED illuminator and the NIR light sensing unit;
analyzing, by an image controlling and processing unit, the reflected NIR light captured by the NIR light sensing unit to generate an image;
determining that a human face exists in the image;
identifying a face region of the human face;
analyzing the face region to extract a feature vector representing the face region;
determining whether a similarity between the feature vector and any of the existing feature vectors in a face feature dictionary is greater than a first threshold; and
when a similarity between the feature vector and a first existing feature vector in the face feature dictionary is greater than the first threshold,
generating a first identification result indicating an identity associated with the first existing feature vector; and
displaying the first identification result;
when the similarity between the feature vector and any of the existing feature vectors in the face feature dictionary is not greater than a first threshold,
generating a second identification result indicating that the feature vector does not exist in the face feature dictionary;
displaying the second identification result; and
storing the face feature in the face feature dictionary,
wherein the image controlling and processing unit coordinates the NIR LED illuminator and the NIR light sensing unit by controlling one or more of:
a duty cycle of the NIR LED illuminator;
an analog gain of the NIR light sensing unit;
a digital gain of the NIR light sensing unit; and
a frame rate of the NIR light sensing unit.

12. The method of claim 11, wherein the NIR light sensing unit is covered with a color filter, the color filter having a passing band between 825 nm and 875 nm.

13. The method of claim 11, wherein the NIR light sensing unit is covered with a color filter, the color filter having a passing band between 915 nm and 965 nm.

14. The method of claim 11, wherein the image controlling and processing unit coordinates the NIR LED illuminator and the NIR light sensing unit to generate an image with optimal imaging quality.

15. The method of claim 11, wherein the determining that a human face exists in the image and the identifying a face region of the human face is by:
employing a deep neural network (DNN).

16. The method of claim 15, wherein the deep neural network is a Multi-Task Convolutional Neural Network (MTCNN).

17. The method of claim 15, wherein the deep neural network is a Fast Region-based Convolutional Neural Network (Fast R-CNN).

18. The method of claim 11, further comprising:
calibrating the face region to a calibrated face region associated with an upright pose of a driver, wherein the calibrated face region is analyzed to extract a feature vector representing the calibrated face region.

19. The method of claim 11, wherein the analyzing the face region to extract a feature vector representing the face region is by employing one or more of:
a backbone network;
a local feature descriptor;
a clustering technique; and
a dimension reduction technique.

20. The method of claim 11, wherein the similarity is a Cosine similarity.

21. A non-transitory tangible computer-readable medium storing instructions which, when executed by one or more processors, cause a method for vehicle driver recognition to be performed, the method comprising:
emitting, by a near infrared (NIR) light-emitting diode (LED) illuminator, NIR light in the vehicle;
capturing, by a near infrared (NIR) light sensing unit, reflected NIR light, wherein the NIR light sensing unit is a focal plane array (FPA) NIR light sensing unit;
coordinating, by an image controlling and processing unit, the NIR LED illuminator and the NIR light sensing unit;
analyzing, by an image controlling and processing unit, the reflected NIR light captured by the NIR light sensing unit to generate an image;
determining that a human face exists in the image;
identifying a face region of the human face;
analyzing the face region to extract a feature vector representing the face region;
determining whether a similarity between the feature vector and any of the existing feature vectors in a face feature dictionary is greater than a first threshold; and
when a similarity between the feature vector and a first existing feature vector in the face feature dictionary is greater than the first threshold,
generating a first identification result indicating an identity associated with the first existing feature vector; and
displaying the first identification result;
when the similarity between the feature vector and any of the existing feature vectors in the face feature dictionary is not greater than a first threshold,
generating a second identification result indicating that the feature vector does not exist in the face feature dictionary;
displaying the second identification result; and
storing the face feature in the face feature dictionary,
wherein the image controlling and processing unit coordinates the NIR LED illuminator and the NIR light sensing unit by controlling one or more of:
a duty cycle of the NIR LED illuminator;

an analog gain of the NIR light sensing unit;
a digital gain of the NIR light sensing unit; and
a frame rate of the NIR light sensing unit.

\* \* \* \* \*